Reissued Oct. 31, 1933

Re. 18,983

UNITED STATES PATENT OFFICE 18,983

MANUFACTURE OF CARBONATE FILLED SIZED PAPER

Harold Robert Rafton, Andover, Mass., assignor to Raffold Process Corporation, a corporation of Massachusetts No Drawing. Original No. 1,803,647, dated May 5, 1931, Serial No. 304,172, September 5, 1928. Application for reissue June 13, 1932. Serial No. 617,041

42 Claims. (Cl. 92—21)

This invention relates to the manufacture of paper and more particularly to an improved sized paper containing a carbonate filler.

The principal object of this invention is to provide a sized paper made with carbonate filler, the sizing agent and precipitant employed being rosin size and alum.

An important object of this invention is to provide a simple and effective process for making an improved sized paper wherein rosin size is added in the beater to a paper mix containing carbonate filler, and wherein alum is added to the paper mix at the wet end of the paper machine.

Other objects and advantages of this invention will become apparent during the course of the following description.

In my copending application Serial No. 304,168, filed September 5, 1928, I have described and claimed a process wherein a sized carbonate filled paper is made by adding a size and a size precipitant to a paper mix in a beater or similar machine, the sizing effect of the reaction product of the size and size precipitant which is deteriorated by the carbonate filler being restored by adding a sizing restoring agent, such as alum, to the mix at the wet end of the paper machine. I have discovered that a satisfactorily sized paper can be produced by treating a paper mix in a manner similar to that disclosed in my copending application referred to by omitting the addition of a size precipitant in the beater and precipitating the size at or subsequent to the point where the mix is diluted prior to its passage on to the web-forming device of the paper machine.

In the preferred practice of my process I add to fibrous material in a beater or similar machine, or in a mixer or similar device when a beater is not employed, carbonate filler of the character hereinafter referred to and size, such as rosin size. Other ingredients such as coloring matter may be added if desired. This mix is then passed through the usual preliminary paper making procedure and at or subsequent to the point when the mix is diluted prior to the passage thereof on to a web-forming device of a paper machine I add preferably continuously to the mix a suitable size precipitant, such as alum, preferably in solution. In this manner, the size precipitant is added at a point where there will be a minimum of intimacy and time of contact of the constituents of the mix before the paper web is formed. The thus treated mix is then passed on to a web-forming device and is subjected to the usual steps for completing the manufacture of finished paper.

It is necessary as indicated to add the size precipitant at or subsequent to the point of dilution of the mix, as I have found that if it be added when the mix is in relatively concentrated condition, and particularly when the relatively concentrated mix is subjected to agitation as is normal in stock chests, the sizing effect is very quickly deteriorated even to the point of complete destruction, except in the case where, as is disclosed in my copending application Serial No. 304,167, filed September 5, 1928, to which cross reference is herewith made, in order to minimize the time of contact, the carbonate filler and the material reactive therewith are brought together in the relatively concentrated mix at a point where the time of contact is to be relatively short, e. g. at the point where the mix is about to pass from the last chest in the stock system, (commonly called the machine chest), or at any point subsequent thereto prior to the point of dilution of the mix. The sizing effect even when the mix is in the diluted condition is gradually deteriorated, but is substantially unaffected within the time limits that the mix is maintained in the dilute state in the usual paper-making procedure. Moreover, although agitation in the dilute state hastens to a certain extent the deterioration of the sizing effect, the speed of deterioration is not nearly so pronounced as in the concentrated condition, and from a practical standpoint I have found that the agitation to which the diluted mix is subjected prior to delivery onto the web-forming device does not deteriorate the sizing effect to a substantial degree.

Of course the size may be added at any point prior to web formation other than in the beater, even after the addition of the alum, but experiments do not indicate that any substantially better sizing effect is obtained thereby although the tendency to foam may be somewhat lessened, and such addition therefore can be considered the substantial equivalent of adding size in the beater.

The alum solution need not be added directly to the fibrous mix, but can be added to the fresh water or white water, e. g. tray water, with which the mix is diluted. If the alum be added to the tray water, only a brief time interval should elapse before the so treated tray water is used for dilution.

Although substantially more foam is produced in the herein described process than in the process referred to in my copending application, (except possibly in that modification wherein size would be added at the wet end of the paper machine after the alum addition), nevertheless the foam is altered in character by the size precipitant before the mix is passed onto the web-forming device, so that what foam is not held back in the riffler or the like is of such nature that it causes substantially no trouble during the formation of the web, and the paper produced by this process has been found to be of a satisfactory quality. Moreover inasmuch as the amount of alum used in the present process is less than that used in the process set forth in my copending application referred to above, the present process therefore results in a more economical operation.

An illustrative furnish suitable for use in the practice of my invention is as follows:

*Materials added in beater*

| | Pounds |
|---|---|
| Fibrous furnish, e. g. sulphite and soda pulps | 1700 |
| Size, e. g. rosin size | 60 |
| Carbonate filler, e. g. calcium carbonate magnesium hydroxide | 300 |

*Material added to mix proportionately and continuously on dilution*

| | Pounds |
|---|---|
| Size precipitant, e. g. alum ($Al_2(SO_4)_3.18H_2O$) | 90 |

Another illustrative furnish is as follows:

*Materials added in beater*

| | Pounds |
|---|---|
| Fibrous furnish, e. g. approximately equal parts of sulphite, soda and old paper stock | 1700 |
| Size, e. g. rosin size | 70 |
| Carbonate filler, e. g. calcium carbonate magnesium hydroxide | 300 |

*Material added to mix proportionately and continuously on dilution*

| | Pounds |
|---|---|
| Size precipitant, e. g. alum ($Al_2(SO_4)_3.18H_2O$) | 105 |

In the above formulæ, the weights of size and carbonate filler refer to the bone dry basis. the weights of all other ingredients being given on the air dry basis.

As indicated above, the primary object of my invention is to obtain sizing in a paper mix containing carbonate filler by the addition of a size precipitant such as alum. Under conditions ordinarily obtaining in paper mixes, this size precipitant would react chemically with the carbonate filler and thus be destroyed. However, I am able to obtain the desired effect of this size precipitant in the paper mix and thus obtain sizing by adjusting conditions under which the size precipitant is added so as to substantially prevent it from reacting chemically with the carbonate filler. There is therefore substantially no conversion of the carbonate filler into a neutral compound by reaction with the size precipitant, and the carbonate filler continues to exist in the mix. Whereas I have not limited myself to any definite amount of carbonate filler, nor any definite amount of size precipitant used, the illustrative furnishes given herein indicate that normally the carbonate filler constitutes a substantial percentage of the total furnish, and consequently of the paper produced, and that it is present in the furnish in an amount greatly in excess of the stoichiometrical equivalent of the size precipitant added. Thus it will be noted that even were conditions such that reaction between the size precipitant and the carbonate filler could take place and go to completion which is substantially not the case in my invention, the final result would not be a neutralization of the mix but rather a using up of the size precipitant, and the mix would remain on the alkaline side owing to the excess carbonate filler present. It is thus apparent that my process, in which a paper is produced containing a substantial quantity of carbonate filler, is wholy unrelated to any paper-making procedure wherein alum or the like is added to a paper mix for the purpose of substantially neutralizing the same so that the final paper will contain substantially no alkaline constituents.

In addition to the copending applications above referred to, cross reference is also made to my other copending applications filed on September 5, 1928, viz, Serial Numbers 304,170, 304,171, 304,173, 304,174, 304,175, 304,176 and 304,177, all of which deal with related subject matter.

In place of alum as a size precipitant I may use with a measure of success an acid such as sulphuric acid ($H_2SO_4$), an acid salt such as sodium bisulphate ($NaHSO_4$), or a salt of a trivalent metal, such as ferric iron or the other salts of aluminum. Of the aluminum salts available I may use the chloride or the like, but I prefer to use ordinary "alum".

In place of rosin size I may use satisfactorily in the practice of my process other sizes, for example soaps, such as oleates, or any other size derived by treatment with an alkaline substance or the like from material originally of acid characteristics or of a partially or completely saponifiable nature, such as saponified beeswax.

When I use the term "rosin size" it is to be understood that I mean it to include any material produced by the action of alkali, generally in aqueous solution, on rosin, or on natural or synthetic resin acid or acids, regardless of the exact composition of the product, or the varying composition which different samples may possess.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, felting, shaping or molding machine.

By the term "carbonate filler" as employed herein, is intended to be included calcium carbonate, of which lime mud from the causticizing process is one form; calcium carbonate magnesium basic carbonate employed in the paper disclosed in my U. S. Patent No. 1,595,416; calcium carbonate magnesium hydroxide disclosed in my U. S. Patent No. 1,415,391; or other substantially water insoluble normal or basic carbonates of alkaline earth metals, (which expression is herein intended to include magnesium), or compounds, double salts, or physically associated mixtures of these with one or more other acid soluble materials of a substantially water insoluble nature. The term "carbonate filler" is also intended to include fibrous material and/or other material such as paper coating constituents or the like containing one or more compounds of the character referred to, such as "old papers" or similar papers, "broke", or the like.

By the term "wet end of the paper machine" is intended to be included those instrumentalities employed in paper maunfacture by which and/or in which a relatively concentrated paper mix is diluted, and treated, conveyed or fed up to the point of web-formation, such as the mixing box, regulating and proportioning devices, riffers, troughs, screens, head boxes, inlets, and the like, including also instrumentalities used in the white water cycle.

While I have described in detail the preferred embodiment of my invention, it is to be understood that the details of procedure, the proportions of ingredients, and the arrangement of steps may be widely varied without departing from the spirit of the invention or the scope of the subjoined claims.

I claim:

1. The method of manufacturing a sized paper filled with carbonate filler comprising adding to a paper mix containing fibrous material, carbonate filler, and size, a size precipitant under conditions favoring the minimizing of the time of contact of the constituents of the mix, and thereafter making paper therefrom.

2. The method of manufacturing a sized paper filled with carbonate filler comprising adding to a paper mix containing fibrous material, carbonate filler, and size, a size precipitant under conditions favoring the minimizing of the intimacy and time of contact of the constituents of the mix, and thereafter making paper therefrom.

3. The method of manufacturing a sized paper filled with carbonate filler comprising adding to a paper mix containing fibrous material, carbonate filler, and rosin size, a size precipitant under conditions favoring the minimizing of the time of contact of the constituents of the mix, and thereafter making paper therefrom.

4. The method of manufacturing a sized paper filled with carbonate filler comprising adding to a paper mix containing fibrous material, carbonate filler, and size, a salt of a trivalent metal under conditions favoring the minimizing of the time of contact of the constituents of the mix, and thereafter making paper therefrom.

5. The method of manufacturing a sized paper filled with carbonate filler comprising adding to a paper mix containing fibrous material, carbonate filler, and size, a salt of aluminum under conditions favoring the minimizing of the time of contact of the constituents of the mix, and thereafter making paper therefrom.

6. The method of manufacturing a sized paper filled with carbonate filler comprising adding to a paper mix containing fibrous material, carbonate filler, and size, alum under conditions favoring the minimizing of the time of contact of the constituents of the mix, and thereafter making paper therefrom.

7. The method of manufacturing a sized paper filled with carbonate filler comprising adding to a paper mix containing fibrous material, carbonate filler, and rosin size, a salt of a trivalent metal under conditions favoring the minimizing of the time of contact of the constituents of the mix, and thereafter making paper therefrom.

8. The method of manufacturing a sized paper filled with carbonate filler comprising adding to a paper mix containing fibrous material, carbonate filler, and rosin size, alum under conditions favoring the minimizing of the time of contact of the constituents of the mix, and thereafter making paper therefrom.

9. The step in a method of manufacturing a sized paper filled with carbonate filler comprising adding at the wet end of the paper machine to a paper mix containing carbonate filler a material for precipitating size.

10. The step in a method of manufacturing a sized paper filled with carbonate filler comprising adding at the wet end of the paper machine to a paper mix containing carbonate filler a material for precipitating size, comprising salt of a trivalent metal.

11. The step in a method of manufacturing a sized paper filled with carbonate filler comprising adding at the wet end of the paper machine to a paper mix containing carbonate filler a material for precipitating size, comprising alum.

12. The step in a method of manufacturing a sized paper filled with carbonate filler comprising adding to a paper mix containing fibrous material, carbonate filler, and a saponified material, a size precipitant at the wet end of the paper machine.

13. The step in a method of manufacturing a sized paper filled with carbonate filler comprising adding to a paper mix containing fibrous material, carbonate filler, and size, a size precipitant at the wet end of the paper machine.

14. The step in a method of manufacturing a sized paper filled with carbonate filler comprising adding to a paper mix containing fibrous material, carbonate filler, and rosin size, a salt of a trivalent metal at the wet end of the paper machine.

15. The step in a method of manufacturing a sized paper filled with carbonate filler comprising adding to a paper mix containing fibrous material, carbonate filler, and rosin size, alum at the wet end of the paper machine.

16. The step in a method of manufacturing a sized paper filled with carbonate filler comprising adding alum to a paper mix containing fibrous material, carbonate filler, and rosin size, when said paper mix is in dilute condition prior to its delivery to the web-forming device of the paper machine.

17. The step in a method of manufacturing a sized paper filled with carbonate filler comprising adding to a paper mix containing fibrous material, rosin size, and carbonate filler comprising an alkaline earth metal carbonate, alum at the wet end of the paper machine.

18. The step in a method of manufacturing a sized paper filled with carbonate filler comprising adding to a paper mix containing fibrous material, rosin size, and carbonate filler comprising calcium carbonate, alum at the wet end of the paper machine.

19. The step in a method of manufacturing a sized paper filled with carbonate filler comprising adding to a paper mix containing fibrous material, rosin size, and carbonate filler comprising calcium carbonate and magnesium compound, alum at the wet end of the paper machine.

20. The step in a method of manufacturing a sized paper filled with carbonate filler comprising adding to a paper mix containing fibrous material, rosin size, and carbonate filler comprising calcium carbonate magnesium hydroxide, alum at the wet end of the paper machine.

21. In a method of manufacturing paper filled with carbonate filler wherein sizing agent and precipitant, without previous reactive contact, are added to the fibrous mix, the improvement which comprises adding said sizing agent at any time prior to web formation, and adding said precipitant under conditions favoring the minimizing of the time of contact of the constituents of the mix.

22. In a method of manufacturing paper filled with carbonate filler wherein sizing agent and precipitant, without previous reactive contact, are added to the fibrous mix, the improvement which comprises adding said sizing agent at any time prior to web formation, and adding said precipitant under conditions favoring the minimizing of the time and intimacy of contact of the constituents of the mix.

23. In a method of manufacturing paper filled with carbonate filler wherein sizing agent and acidic material, without previous reactive contact, are added to the fibrous mix, the improvement which comprises adding said sizing agent at any time prior to web formation, and adding said acidic material under conditions favoring the minimizing of the time of contact of the constituents of the mix.

24. In a method of manufacturing paper filled with carbonate filler wherein sizing agent and metallic salt, without previous reactive contact, are added to the fibrous mix, the improvement which comprises adding said sizing agent at any time prior to web formation, and adding said metallic salt under conditions favoring the minimizing of the time of contact of the constituents of the mix.

25. In a method of manufacturing paper filled with carbonate filler wherein sizing agent and aluminum compound, without previous reactive contact, are added to the fibrous mix, the improvement which comprises adding said sizing agent at any time prior to web formation, and adding said aluminum compound under conditions favoring the minimizing of the time of contact of the constituents of the mix.

26. In a method of manufacturing paper filled with carbonate filler wherein sizing agent and alum, without previous reactive contact, are added to the fibrous mix, the improvement which comprises adding said sizing agent at any time prior to web formation, and adding said alum under conditions favoring the minimizing of the time of contact of the constituents of the mix.

27. In a method of manufacturing paper filled with carbonate filler wherein sizing agent and precipitant, without previous reactive contact, are added to the fibrous mix, the improvement which comprises adding said sizing agent at any time prior to web formation, and adding said precipitant at the wet end of the paper machine.

28. In a method of manufacturing paper filled with carbonate filler, that step comprising adding sizing agent, said sizing agent being without previous reactive contact with material capable of precipitating the same, to the fibrous mix under conditions favoring the minimizing of the time of contact of the constituents of the mix.

29. In a method of manufacturing paper filled with carbonate filler, that step comprising adding rosin size, said rosin size being without previous reactive contact with material capable of precipitating the same, to the fibrous mix under conditions favoring the minimizing of the time of contact of the constituents of the mix.

30. In a method of manufacturing paper filled with carbonate filler, that step comprising adding sizing agent, said sizing agent being without previous reactive contact with material capable of precipitating the same, to the fibrous mix under conditions favoring the minimizing of the time and intimacy of contact of the constituents of the mix.

31. In a method of manufacturing paper filled with carbonate filler, that step comprising adding sizing agent, said sizing agent being without previous reactive contact with material capable of precipitating the same, to the fibrous mix at the wet end of the paper machine.

32. In a method of manufacturing paper filled with carbonate filler, the improvement which comprises adding sizing agent and precipitant, without previous reactive contact, to the fibrous mix under conditions favoring the minimizing of the time of contact of the constituents of the mix.

33. In a method of manufacturing paper filled with carbonate filler, the improvement which comprises adding sizing agent and precipitant, without previous reactive contact, to the fibrous mix under conditions favoring the minimizing of the time and intimacy of contact of the constituents of the mix.

34. In a method of manufacturing paper filled with carbonate filler, the improvement which comprises adding sizing agent and precipitant, without previous reactive contact, to the fibrous mix at the wet end of the paper machine.

35. In a method of manufacturing paper filled with carbonate filler, the improvement which comprises adding sizing agent and acidic material, without previous reactive contact, to the fibrous mix under conditions favoring the minimizing of the time of contact of the constituents of the mix.

36. In a method of manufacturing paper filled with carbonate filler, the improvement which comprises adding rosin size and acidic material, without previous reactive contact, to the fibrous mix under conditions favoring the minimizing of the time of contact of the constituents of the mix.

37. In a method of manufacturing paper filled with carbonate filler, the improvement which comprises adding sizing agent and metallic salt, without previous reactive contact, to the fibrous mix under conditions favoring the minimizing of the time of contact of the constituents of the mix.

38. In a method of manufacturing paper filled with carbonate filler, the improvement which comprises adding sizing agent and alum, without previous reactive contact, to the fibrous mix under conditions favoring the minimizing of the time of contact of the constituents of the mix.

39. In a method of manufacturing paper filled with carbonate filler, the improvement which comprises adding rosin size and alum, without previous reactive contact, to the fibrous mix under conditions favoring the minimizing of the time of contact of the constituents of the mix.

40. In a method of manufacturing paper filled with carbonate filler, the improvement which comprises adding rosin size and alum, without previous reactive contact, to the fibrous mix at the wet end of the paper machine.

41. In a method of manufacturing paper filled with carbonate filler the improvement which comprises the step of adding acidic material to the fibrous mix under conditions favoring the minimizing of the time of contact of the constituents of the mix, and the subsequent step of making paper from the mix.

42. In a method of manufacturing paper filled with carbonate filler the improvement which comprises the step of adding metallic salt to the fibrous mix under conditions favoring the minimizing of the time of contact of the constituents of the mix, and the subsequent step of making paper from the mix.

HAROLD ROBERT RAFTON.